(12) United States Patent
Shimizu et al.

(10) Patent No.: US 7,330,334 B2
(45) Date of Patent: Feb. 12, 2008

(54) MAGNETIC DISK APPARATUS WITH SHROUD AND HAVING OPEN SPACE DOWNSTREAM OF MOVEABLE ARMS IN COMMUNICATION WITH BYPASS CHANNEL

(75) Inventors: Hayato Shimizu, Ryugasaki (JP); Masao Iwakura, Odawara (JP); Shigeo Nakamura, Odawara (JP); Kazuo Sakai, Chiyoda (JP); Shigenori Togashi, Abiko (JP); Masayuki Kaiho, Chiyoda (JP); Toshiaki Kobari, Chiyoda (JP); Mikio Tokuyama, Tsukuba (JP); Satomitsu Imai, Odawara (JP); Shozo Saegusa, Chiyoda (JP); Masahiko Sega, Hiratsuka (JP); Toshihisa Okazaki, Odawara (JP); Yuzo Yamaguchi, Shimonoseki (JP)

(73) Assignee: Hitachi Global Storage Technologies Japan, Ltd., Odawara-shi (JP)

( * ) Notice: Subject to any disclaimer, the term of this patent is extended or adjusted under 35 U.S.C. 154(b) by 0 days.

(21) Appl. No.: 11/129,335

(22) Filed: May 16, 2005

(65) Prior Publication Data

US 2005/0219741 A1    Oct. 6, 2005

Related U.S. Application Data

(63) Continuation of application No. 10/409,450, filed on Apr. 9, 2003, now Pat. No. 6,898,049, which is a continuation of application No. 10/103,318, filed on Mar. 22, 2002, now Pat. No. 6,600,626, which is a continuation-in-part of application No. 09/356,056, filed on Jul. 16, 1999, now Pat. No. 6,369,978.

(30) Foreign Application Priority Data

Jul. 17, 1998    (JP) ................................ 10-202912
Sep. 17, 1998   (JP) ................................ 10-262710

(51) Int. Cl.
    *G11B 33/14*     (2006.01)
(52) U.S. Cl. ................................. 360/97.03
(58) Field of Classification Search ............ 360/97.02, 360/97.03; 720/648, 649
    See application file for complete search history.

(56) References Cited

U.S. PATENT DOCUMENTS 4,583,213 A    4/1986    Bracken et al.

(Continued)

FOREIGN PATENT DOCUMENTS

JP    60136984 A    *  7/1985
JP    2001338483 A  * 12/2001

*Primary Examiner*—Brian E. Miller
(74) *Attorney, Agent, or Firm*—Antonelli, Terry, Stout & Kraus, LLP.

(57) ABSTRACT

A magnetic disk apparatus includes a plurality of magnetic disks driven to rotate by a spindle motor, arms supporting magnetic heads on the magnetic disks, an actuator for moving the arms on the magnetic disks by a voice coil motor, and a housing which surrounds the magnetic disks, the arms and the actuator. A shroud which arcuately surrounds the magnetic disks along the outer periphery thereof has an opened portion for inserting the arms is formed in a part of the housing. The shroud on an upstream side of the arms relative to airflow generated by the magnetic disks when rotating is provided with an opening having a greater width than that of a gap defined between the shroud and the outer periphery of the magnetic disks. An empty bypass channel is provided which communicates from the opening through a rear side of the voice coil motor to the downstream side of the arms.

9 Claims, 6 Drawing Sheets

U.S. PATENT DOCUMENTS

| | | |
|---|---|---|
| 4,647,997 A | 3/1987 | Westwood |
| 4,660,110 A | 4/1987 | Iida et al. |
| 4,857,087 A | 8/1989 | Bolton et al. |
| 5,086,422 A | 2/1992 | Hagiya et al. |
| 5,541,791 A | 7/1996 | Yamasaki et al. |
| 5,631,787 A | 5/1997 | Huang et al. |
| 5,696,649 A | 12/1997 | Boutaghou |
| 5,790,511 A | 8/1998 | Juso et al. |
| 5,898,545 A | 4/1999 | Schirle |
| 5,907,453 A * | 5/1999 | Wood et al. ............. 360/97.02 |
| 5,999,371 A | 12/1999 | Wood et al. |
| 6,091,570 A * | 7/2000 | Hendriks ................. 360/97.03 |
| 6,125,003 A | 9/2000 | Tsuda et al. |
| 6,208,484 B1 | 3/2001 | Voights |
| 6,369,977 B1 * | 4/2002 | Imai et al. ............... 360/97.02 |
| 6,369,978 B1 | 4/2002 | Shimizu et al. |
| 6,487,038 B1 * | 11/2002 | Izumi et al. ............. 360/97.02 |
| 2003/0156352 A1 * | 8/2003 | Voights et al. ........... 360/97.02 |

* cited by examiner

MAGNETIC DISK APPARATUS WITH SHROUD AND HAVING OPEN SPACE DOWNSTREAM OF MOVEABLE ARMS IN COMMUNICATION WITH BYPASS CHANNEL

CROSS REFERENCE TO RELATED APPLICATION

This is a continuation of U.S. application Ser. No. 10/409,450, filed Apr. 9, 2003, now U.S Pat. No. 6,898,049, which is a continuation of U.S. application Ser. No. 10/103,318, filed Mar. 22, 2002, now U.S. Pat. No. 6,600,626, which is a continuation-in-part application of U.S. application Ser. No. 09/356,056, filed Jul. 16, 1999, now U.S. Pat. No. 6,369,978, the subject matter of which is incorporated by reference herein.

BACKGROUND OF THE INVENTION

The invention relates to a magnetic disk apparatus, and more particularly, a housing structure of a magnetic disk apparatus, which houses therein a plurality of stacked rotating disks for reading and writing information and a rotary actuator supporting a head for reading and writing information on the disks, such that the head is movable between the disks.

With conventional magnetic disk apparatuses, turbulence of an air flowing between disks causes vibration of the disks called "flutter". When a head is positioned on a disk generating such flutter, the head is degraded in positional accuracy with respect to tracks for reading and writing of information.

As a prior art (1), Japanese Patent Unexamined Publication No. 10-162548 describes a method for forcedly generating an airflow directed to outer peripheries of disks from inner peripheries thereof. As a further prior art (2), there has been proposed a method for reducing a spacing between rotating disks and a housing called a "shroud" which surrounds the disks and is formed concentrically with the disks. Such a shroud is a part of the housing that is disposed in a magnetic disk apparatus to cover components such as magnetic disks, an actuator for positioning of a head, and the like, the shroud surrounding side surfaces of the disks.

An airflow generated around rotating disks includes a primary flow, in which air is dragged by revolution of the disks to flow in a circumferential direction, and a secondary flow, in which air in the vicinity of disk surfaces flows toward outer peripheries of the disks and air between the disks flows toward inner peripheries of the disks. Since the secondary flow involves unstable air turbulence, the prior art (1) is directed to suppressing the occurrence of flutter by generating a forced airflow directed toward the outer peripheries of the disks from the inner peripheries thereof so as to reduce the unstable airflow caused by the secondary flow.

The prior art (2) is directed to reducing flutter by decreasing a gap between disks and a shroud to suppress that incoming and outgoing of air on the top and bottom surfaces of disks, which would be produced in the event of the gap between the disks and the shroud being large, to prevent a pressure difference between the top and bottom surfaces from varying with the passage of time.

As a prior art (3), Japanese Patent Unexamined Publication No. 7-320478 describes a housing structure making use of an airflow circulating in a housing of a magnetic disk apparatus for other purposes than reduction of flutter, and discloses a method for removing dust by means of a filter and cooling an interior of the housing.

If the housing structure of a magnetic disk apparatus is the same, flutter caused by turbulence of an air flowing between disks increases substantially in proportion to a square of a disk radius and the number of revolutions of the disks. Therefore, a housing structure is needed, which reduces flutter having an adverse influence on head positional accuracy, in reduction of track intervals making magnetic disks high in capacity and in increase in the number of revolutions required for achieving high speed.

Provided that the housing structure of a magnetic disk apparatus is the same, the driving power for revolution of disks is substantially proportional to third power of the number of revolutions and fifth power of a disk radius. Accordingly, as with flutter mentioned above, it is necessary to obtain a housing structure that reduces an airflow tending to impose a burden on a rotating driving force, thus reducing a disk driving power in increasing the number of revolutions required for making the magnetic disk apparatus high in speed.

However, the method for forcedly generating an airflow directed toward outer peripheries of disks from inner peripheries thereof offers the following problem. Such method for forcedly generating an airflow directed toward outer peripheries of disks from inner peripheries thereof becomes ineffective because respective arms of a rotary actuator adapted to be inserted between stacked disks block the airflow directed toward the outer peripheries of the disks from the inner peripheries thereof if these arms have a thickness of half or more of an interval between the disks.

Also, the method, in which a gap between disks and a housing called a "shroud" and formed concentric with rotating disks is made small, offers the problem set forth below.

With the method, in which a gap between disks and a housing called a "shroud" and formed concentric with rotating disks is made small, one of the causes for occurrence of flutter can be dissolved because it is possible to suppress fluctuation of pressure difference with the passage of time, which is caused by incoming and outgoing of an airflow on top and bottom surfaces of the disks, even when arms of the rotary actuator are inserted between the disks. However, when the arms are inserted between the disks, they will block the primary airflow, which is dragged by the revolving disks to flow in the circumferential direction. As a result, a high pressure region is generated on an upstream side of the arms while a low pressure region is generated on a downstream side of the arms.

In addition, an air flowing in the circumferential direction on the upstream side of the arms is curved toward the inner peripheries of the disks by the arms to produce a high speed flow directed toward the inner peripheries of the disks. Since such flow directed toward the inner peripheries of the disks tends to return around tip ends of the arms to the outer peripheries of the disks, so it will merge with a flow on the downstream side of the arms to generate turbulence, so that pressure difference between the high pressure on the upstream side of the arms and the low pressure on a downstream side of the arms fluctuates. Such pressure fluctuation causes not only flutter but also a fluctuating force called "wind turbulence" tending to swing the arms. Such swinging of the arms is also responsible for degradation of the head positional accuracy in the magnetic disk apparatus.

Thus, either of the method for forcedly generating an airflow directed toward outer peripheries of disks from inner peripheries thereof, and the method, in which a gap between disks and a shroud is made small, disclosed in the prior art offers a problem that pressure fluctuation generated upon insertion of the arms between the disks cannot be reduced.

Meanwhile, the prior art (3) making use of an airflow circulating in a housing of a magnetic disk apparatus also offers a problem set forth below.

The low pressure region produced on the downstream side of the arms draws in air from outside of the disks. Therefore, when the shroud covers the downstream side of the arms to decrease a gap between the downstream side of the arms and the shroud, high speed airflow enters through the gap into spaces between the disks, thereby causing a significant pressure fluctuation. Presence of a flow passage connecting the upstream and downstream sides of the arms will reduce pressure difference between the upstream and downstream sides of the arms. Thus, pressure loss caused by the insertion of the arms between the disks is reduced, so that the driving power for revolution of the disks is correspondingly reduced.

However, when a flow passage connecting the upstream and downstream sides of the arms is defined in a rotating shaft of the rotary actuator or inside the voice coil motor for driving of the actuator, it inevitably results in a narrow flow passage with many curves, and so causes a considerable pressure fluctuation between disks for the similar reason as mentioned above. The foregoing flow passage is effective in removing dust and cooling the voice coil motor that generates heat. However, it is very likely that wind turbulence and flutter increase when airflow flows through the arm section and an interior of the voice coil motor, which are complex in structure tending to easily develop flow turbulence. In addition, it is unnecessary in a relatively small-sized magnetic disk apparatus to cool the voice coil motor.

SUMMARY OF THE INVENTION

Accordingly, an object of the invention is to provide a magnetic disk apparatus having a housing structure, which enables suppressing pressure fluctuation, which would occur when arms of a rotary actuator are inserted between the disks, to reduce flutter and wind turbulence.

Another object of the invention is to provide a magnetic disk apparatus having a housing structure, which can prevent generation of additional pressure fluctuation on upstream and downstream sides of arms, thus reducing driving power.

To these ends, the invention provides a magnetic disk apparatus comprising a plurality of magnetic disks stacked on a rotating shaft, arms supporting thereon magnetic heads and adapted to be inserted between the magnetic disks, a rotary actuator for moving the arms, a housing having an arcuate-shaped shroud, which surrounds the side surfaces of the magnetic disks so as to permit movements of the arms and which is concentric with the magnetic disks, a space opened from the shroud and located on a downstream side of the arms relative to an air flow, which is generated by the revolution of the magnetic disks and moves on surfaces of the magnetic disks, an opening provided on the shroud on an upstream side of the arms relative to the airflow and having a greater width than that of a gap defined between the magnetic disks and the shroud, and a cover, which constitutes a part of the shroud to cover a voice coil motor for driving the rotary actuator, and forms between the cover and an inner wall of the housing a bypass channel for providing communication between the opening and the opened space, and wherein the bypass channel has a linear section of a predetermined length extending from the opening.

The housing structure comprises a space not covered by the shroud and provided on a downstream side of the arms, and a channel, which connects an upstream side of the arms to the space not covered by the shroud and provided on the downstream side of the arms, the channel being provided with a linear section, which has a rectifying effect on an airflow and has a depth of five times or more a width of the channel and a length of five times or more the width of the channel.

According to a feature of the present invention, the bypass channel may be constructed to have a depth of 5D or more in a direction parallel to a rotating shaft where D is a spacing or width of the linear section.

According to another feature of the present invention, the bypass channel may be constructed to have a linear section having a length of at least 5D or more where D is a spacing or width of the linear section.

In accordance with a further feature of the present invention, the bypass channel may be constructed to have a linear section having a depth of 5D or more and a length of at least 5D or more in a direction parallel to a rotating shaft where D is a spacing or width of the linear section.

In accordance with another feature, the cover may be configured to cover at least a side surface of the voice coil motor.

According to a still further feature of the present invention, the cover may be a component which encloses a coil section of the voice coil motor and at least a side surface of which is closed to prevent airflow from coming into the voice coil motor from the bypass channel.

Still further advantages of the invention will become apparent to those of ordinary skill in the art upon reading and understanding the following detailed description of the preferred and alternate embodiments.

BRIEF DESCRIPTION OF THE DRAWINGS

The invention will be described in conjunction with certain drawings which are for the purpose of illustrating the preferred and alternate embodiments of the invention only, and not for the purposes of limiting the same, and wherein.

DETAILED DESCRIPTION OF THE PREFERRED AND ALTERNATE EMBODIMENTS

Figure 1:
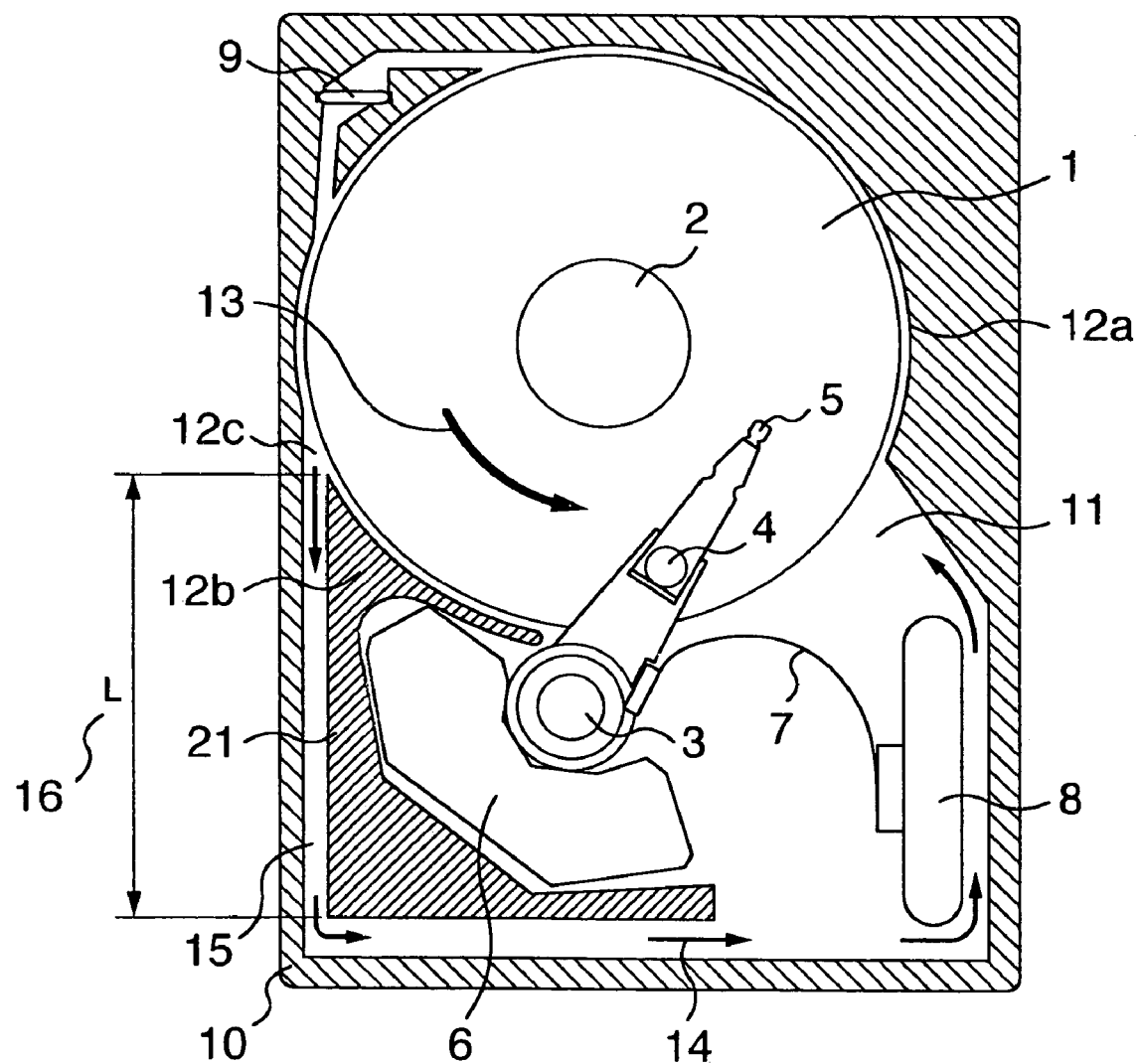
FIG. 1 is a cross-sectional view illustrating a configuration of a magnetic disk apparatus in accordance with the invention.

An embodiment of the invention will be described with reference to FIG. 1 through FIG. 3D. FIG. 1 is a cross-sectional view showing a configuration of a magnetic disk apparatus in accordance with the invention.

Figure 2:
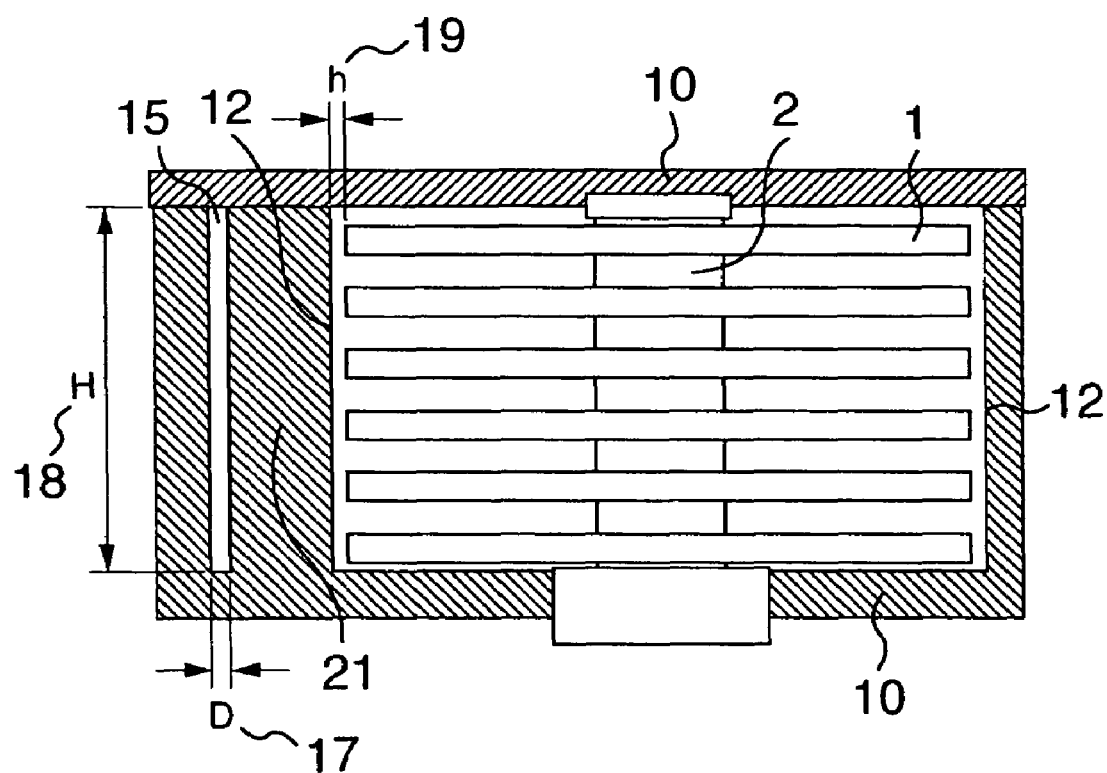
FIG. 2 is a longitudinal sectional view illustrating a housing structure of the magnetic disk apparatus of the invention.

FIG. 2 is a longitudinal sectional view illustrating a housing structure of the magnetic disk apparatus of the invention. FIGS. 3A through 3D show results of comparison in pressure fluctuation and power consumption of the device with and without a bypass channel in accordance with the invention.

As shown in FIG. 1, the magnetic disk apparatus according to the invention is constructed as set forth below. A magnetic disk stack is composed of a plurality of disks 1 that are stacked on and fixed to a magnetic disk rotating shaft 2 connected to a spindle motor (not shown). Arms 4 are driven on a turning arm shaft 3. A coil (not shown) is provided on the arms 4 toward the turning arm shaft 3 to drive the arms 4, the coil and a magnet (referred to as a "voice coil motor 6" for the sake of convenience) provided on a side of a housing 10 constituting a rotary actuator. Magnetic disk read/write head 5 are provided on tip ends of the arms 4. A motor cover 21 is a part of the housing that surrounds the voice coil motor 6, which constitutes the rotary actuator.

In addition to the components mentioned above, an input/output signal wire 7 and a signal wire terminal 8 for the magnetic head 5, a filter 9 for cleaning air in spaces between the magnetic disks, etc. are received in the housing 10 of the magnetic disk apparatus as required, and hermetically sealed to be isolated from the outside of the housing. In this embodiment, the filter 9 is provided, and an air inlet for the filter 9 and an exhaust port are provided in a part of a shroud, which covers an outer periphery of the disks 1. However, it goes without saying that the filter 9 may be omitted.

Referring to FIG. 1, a direction of revolution of the disks being fixed as indicated by an arrow 13, air flows between disks in the direction indicated by the arrow 13. With respect to the direction of the arrow 13, an upstream side of the arms 4 is defined as a left side of the arms 4 as viewed in the drawing, and a downstream side of the arms 4 is defined as a right side of the arms 4 in the drawing. Ensured in an arm downstream space 11 located downstream of the arms 4 and outside the outer periphery of the disk stack 1 is a space, which is not occupied by the shroud to be free from the shroud, and which allows all the arms 4 of the rotary actuator to move about the shaft 3 outside the disk stack 1.

As shown in FIG. 1, the signal wire 7 and the signal wire terminal 8 for input/output for the magnetic head 5 are disposed in the above-mentioned space. A shroud 12a defines a part of the housing 10, which is formed to be concentric with the disk stack 1. A shroud 12b constitutes a part of the housing structure of the magnetic disk apparatus, and also defines a part of the motor cover 21 in the embodiment of the invention. Like the shroud 12a, the shroud 12b is also shaped to be concentric with the disk stack 1. Here, the concentric configuration means a shape having a wall surface that is equidistant from the rotating shaft 2, to which the disk stack 1 is fixed.

In the embodiment of the invention, the shrouds 12a and 12b are formed to be concentric with the disk stack 1 in areas other than areas where the arm downstream space 11 and the air introduction passage into the filter 9 are located. The motor cover 21 is disposed on the upstream side of the shroud 12b positioned on the upstream side of the arms such that a gap is provided between the motor cover and the inner wall of the magnetic disk apparatus housing 10 to form a shroud opening 12c.

A bypass channel 15 is defined by forming side surfaces of the motor cover 21 and of the housing 10 to provide a parallel gap between the shroud opening 12c and the arm downstream space 11. The shroud 12b of the motor cover 21 located on the upstream side of the arms is provided in the vicinity of the arms 4 so as to block airflow toward the voice coil motor 6 but not to interfere with the required turning of the arms 4. In addition, the motor cover 21 may be formed either integrally with the housing 10 or formed as a separate piece for assembly.

Air in the housing of the embodiment flows as indicated by an arrow 14 in FIG. 1. Revolution of the disk stack 1 causes the air to flow in the circumferential direction indicated by the arrow 13 between adjacent disks, so that the air flow is blocked by the arms 4 to produce a high pressure area on the upstream side of the arms 4. On the other hand, the air pressure decreases on the downstream side of the arms 4 to cause an air in the arm downstream space 11 to be drawn into between the disks. Here, the bypass channel 15 connects the high pressure upstream side of and the low pressure downstream side of the of the arms 4, so that the air flow is caused as indicated by an arrow 14.

Figure 6:
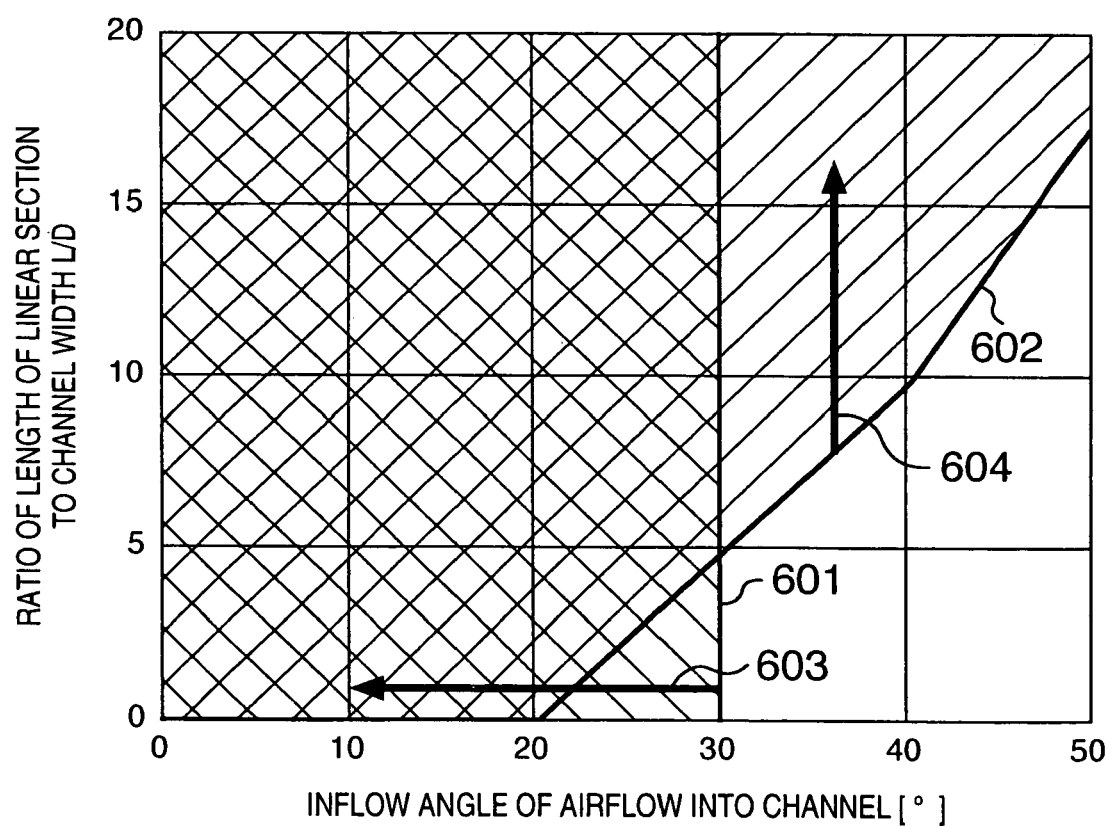
FIG. 6 is a graph showing an inflow angle of an airflow relative to a ratio of a length of the linear section and a channel width of the bypass channel.

The configuration of the bypass channel 15 will now be described with reference to FIG. 2 and FIG. 6. FIG. 2 is a longitudinal sectional view showing the housing structure of the magnetic disk apparatus in accordance with the invention, in which a section associated with the rotary actuator is omitted. FIG. 6 shows a relationship between an inflow angle of airflow and a ratio of a length of a linear section and a width of the bypass channel.

As shown in FIG. 2, the bypass channel 15 is composed of parallel walls to have a larger width D (denoted by 17 in the drawing) than a gap h (denoted by 19 in the drawing) between the shroud 12 and the disk stack 1 and a depth H (denoted by 18 in the drawing) equal to or more than the height of the disk stack 1. The depth H should be five times or more the width D. Because of the depth H five times or more the width D, the pressure loss at the shroud opening 12c can be maintained substantially at a constant level even when the direction of the airflow entering into the bypass channel 15 from the shroud opening 12c as shown in FIG. 1 varies depending on the position of the arms 4. Therefore, the provision of the bypass channel 15 can be effective reducing pressure fluctuation irrespective of the position of the arms 4.

Moreover, the bypass channel 15 is provided with the linear section, which has a length L (denoted by 16 in the drawing), as shown in FIG. 1, corresponding to five times or more the width D. The flow entering into the bypass channel 15 sometimes comes off to generate a pulsating flow at a tip end, which forms a part of the motor cover 21 toward the shroud opening 12c and at which the bypass channel 15 is in contact with the shroud 12b. Even when such pulsating flow is generated, the linear section having the length L can attenuate flow speed fluctuation because the length L is at least five times the width D. Since coming-off tending to generate an airflow turbulence takes place mostly at the shroud opening 12c, it suffices that the linear section is located on the downstream side of the shroud opening 12c. So, portions of the bypass channel 15 except the linear section does not need to have a width D of one fifth or less of the depth H and a rectangular-shaped cross section as shown in FIG. 2.

Relationships among the length of the bypass channel and so on will be described with reference to FIG. 6.

The axis of abscissa in a graph shown in FIG. 6 indicates an inflow angle of an air flow entering into the bypass channel. With the magnetic disk apparatus, such inflow angle varies depending on a manner of mounting the opening or a position of the arms of the rotary actuator. A tangent line of the disk stack 1 serves as a reference for the inflow angle. Herein, such reference is provided by a tangent line at an end of the disk stack 1 closest to the side face of the magnetic disk apparatus, in which the bypass channel 15 is formed. A line 601 in the graph indicates an inflow angle, at which air can flow into the bypass channel 15 despite of a pressure loss in the bypass channel 15. Thus, the bypass channel in accordance with the invention is made effective in an area 603 on the left side of the line 601 in the graph.

The axis of ordinate in FIG. 6 indicates a ratio of length to width L/D of the linear section. A curve 602 plots values of L/D of a linear section L required for airflow turbulence to assume a constant value in the bypass channel, relative to respective inflow angles. The bypass channel exhibits a rectifying effect in a region above the curve 602. As shown in the graph, an intersection point of the line 601 and the curve 602 is in most cases near a point where the value of L/D assumes 5. It is seen that, with the value of L/D being 5 or more, airflow is generated in the bypass channel irrespective of the manner of mounting of the opening and the position of the arms of the rotary actuator, and that turbulence is attenuated in the linear section to provide the rectifying effect.

The analysis results shown in FIG. 6 are ones when the width D of the linear section is one fifth or less of the depth H, and are almost the same when the value of H/D is 5 or more. When the value of H/D is smaller than 5, the bypass channel is increased in pressure loss. Therefore, no airflow is sometimes generated in the bypass channel depending on the position of the arms of the rotary actuator, so that advantages of the invention cannot be obtained.

Likewise, if the width D of the bypass channel is smaller than the shroud gap h, then the bypass channel is sometimes increased in pressure loss, and advantages of the invention cannot be obtained. Thus, as described above, advantages of the invention can be obtained irrespective of the manner of mounting of the opening and the position of the arms of the rotary actuator, provided that the channel width D of the linear section of the bypass channel is greater than the shroud gap h, the length L of the linear section is 5D or more, and the depth H of the linear section is also 5D or more.

In this manner, a pressure difference between the high-pressure upstream side of and the low-pressure downstream side of the arms 4 decreases. Furthermore, since airflow is rectified in the linear section of the bypass channel 15, an airflow free from turbulence comes into the arm downstream space 11 to be reduced there in speed, and slowly enters into spaces between adjacent disks so as not to impede airflow accompanying the revolution of the disk stack 1. As described above, the airflow in the housing in accordance with the invention reduces the pressure loss, which would generate due to the pressure difference between the upstream side of and the downstream side of the arms 4 as the result of the presence of the arms to thereby reduce the driving torque required for revolution of the disk stack 1 and to control an amplitude of fluctuations in pressure difference between the upstream side of and the downstream side of the arms 4 with the passage of time, which is responsible for wind turbulence. Further, airflow entering into the spaces between adjacent disks at the downstream side of the arms is reduced in turbulence with the result that flutter is reduced.

With reference to FIG. 3, advantages of the invention will now be described by way of results obtained by analysis of unsteady flow. FIG. 3A shows results obtained when disks have a diameter of 65 mm, a gap h between the shroud and the disks is 0.7 mm, and the disks revolve at 12000 rpm.

Figure 3A:
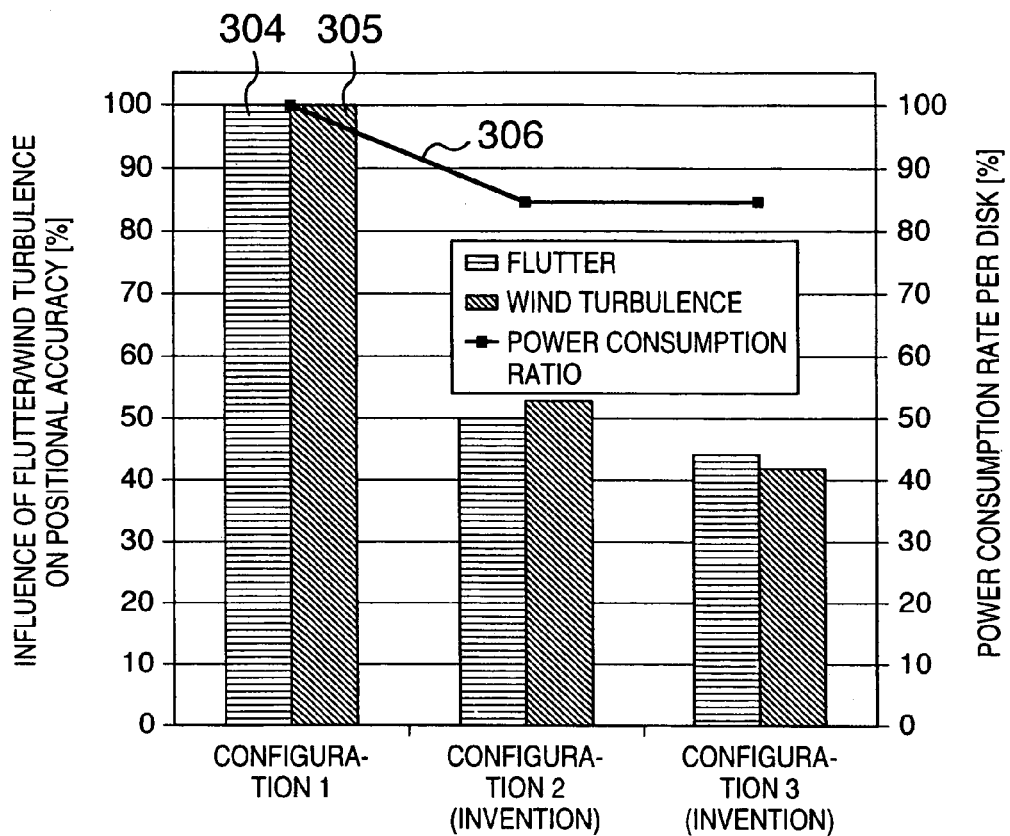
FIG. 3A through FIG. 3D are diagrams showing results of comparison in pressure fluctuation and power consumption of the device with and without a bypass channel in accordance with the invention.
Figure 3B:
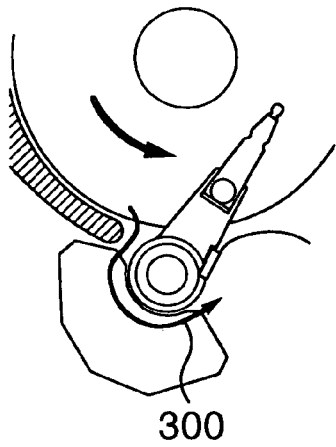
Figure 3C:
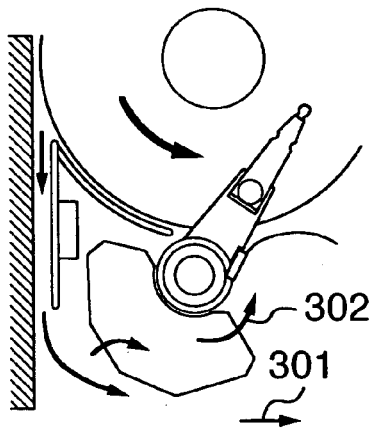
Figure 3D:
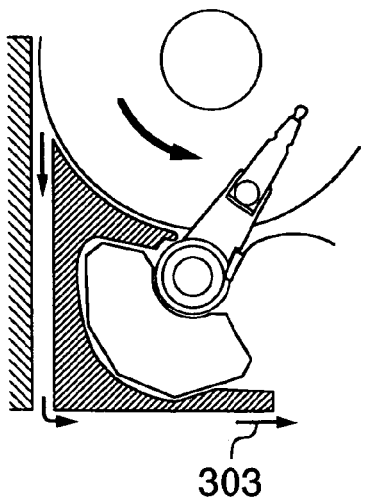

A configuration 1 is shown in FIG. 3B, a configuration 2 is shown in FIG. 3C, and a configuration 3 is shown in FIG. 3D. FIG. 3A shows comparison among these three configurations with respect to a degree of influence (304) of flutter on positional accuracy, a degree of influence (305) of wind turbulence on the positional accuracy, and a ratio (306) of power consumption for revolutions every disk. All the configurations shown in FIG. 3B through 3D are the same except the shape of the housings.

Configuration 1 is not equipped with the bypass channel 15 of the invention, and the shroud 12 covers the upstream side of the arms 4. In configuration 1, air flows through a gap between the arm rotating shaft 3 and the voice coil motor 6 as indicated by an arrow 300 in FIG. 3B.

The configurations 2 and 3 are equipped with the bypass channel 15 of the invention that has a width D of 2 mm and a depth H of 20 mm. With the configuration 2, the motor cover 21 of the invention is formed of a flat plate, and the linear section L of the bypass channel is approximately 10 mm. Furthermore, with the configuration 2, a gap between the rotating shaft 3 of and the voice coil motor 6 of the rotary actuator is not closed. Accordingly, almost the air flows as indicated by an arrow 301 in the drawing while a part of the air flows in the voice coil motor as indicated by an arrow 302 in the drawing.

With the configuration 3, the gap is closed, so that the air flows as indicated by an arrow 303. Like the degree of influence (304) of flutter on the positional accuracy, the degree of influence (305) of wind turbulence on the positional accuracy and the power consumption ratio (306) are indicated with those for the configuration 1 being 100%. As apparent from FIGS. 3A through 3D, the bypass channel 15 of the invention reduces the power consumption as well as the influences of the flutter and wind turbulence.

Figure 4:
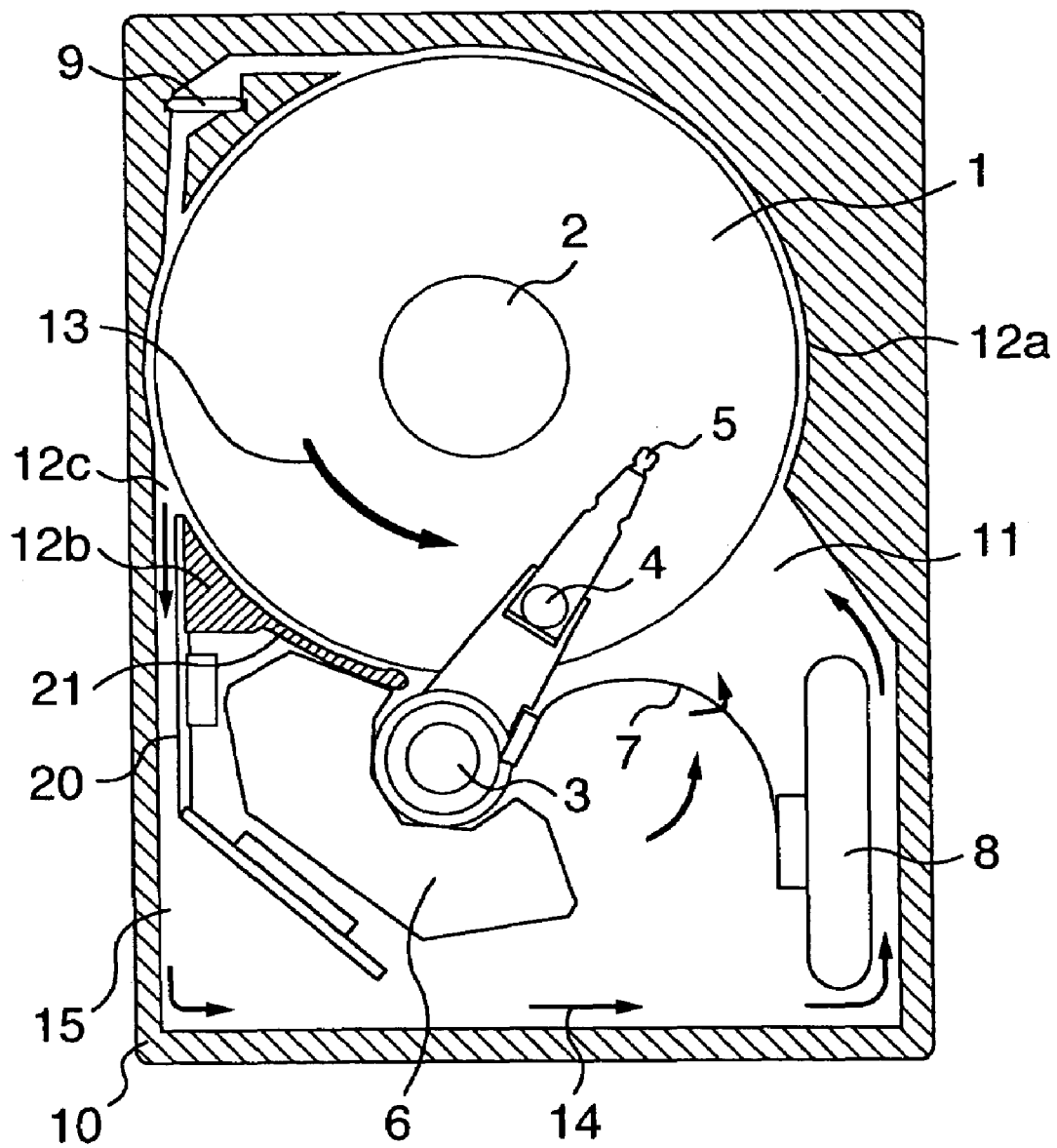
FIG. 4 is a cross-sectional view illustrating a configuration of a magnetic disk apparatus according to a further embodiment of the invention.

Another embodiment of the invention will be described with reference to FIG. 4. FIG. 4 is a cross-sectional view showing a configuration of a magnetic disk apparatus in another embodiment, to which the invention is applied. This embodiment differs from the embodiment shown in FIG. 1 in a manner of forming a bypass channel 15.

In the embodiment, components such as a shroud 12a and a filter 9 are the same as those shown in FIG. 1. An arm downstream space 11 is not provided with any shroud whereby a space sufficient to permit all arms 4 of the rotary actuator to move about a shaft 3 outside a disk stack 1 is ensured. As with the configuration shown in FIG. 1, a signal wire 7 and a signal wire terminal 8 for input/output of a magnetic head 5 are arranged in the space.

As shown in FIG. 4, a motor cover 21 in the embodiment is formed by having a shroud of a housing 10 extended to an upstream side of the arms 4 and cutting off the same partly for the provision of an opening 12c. A guide vane 20 for defining the bypass channel 15 is formed by mounting a plate, which has been made separately from the housing 10, so as to make the same parallel to the inner wall of the housing 10.

In the embodiment shown in FIG. 4, the guide vane 20 is bent downstream of the linear section of the bypass channel 15 so as to block airflow into a voice coil motor 6. Further, a wall surface of the bypass channel 15, which mates with the guide vane 20, may not be defined by the inner wall of the housing 10 but may be defined by mounting a flat plate to the housing 10 like the guide vane 20. According to this embodiment, it is simply possible to obtain the same effect as that in the aforesaid embodiment shown in FIG. 1 without forming the housing 10 in complicated manner.

Figure 5:
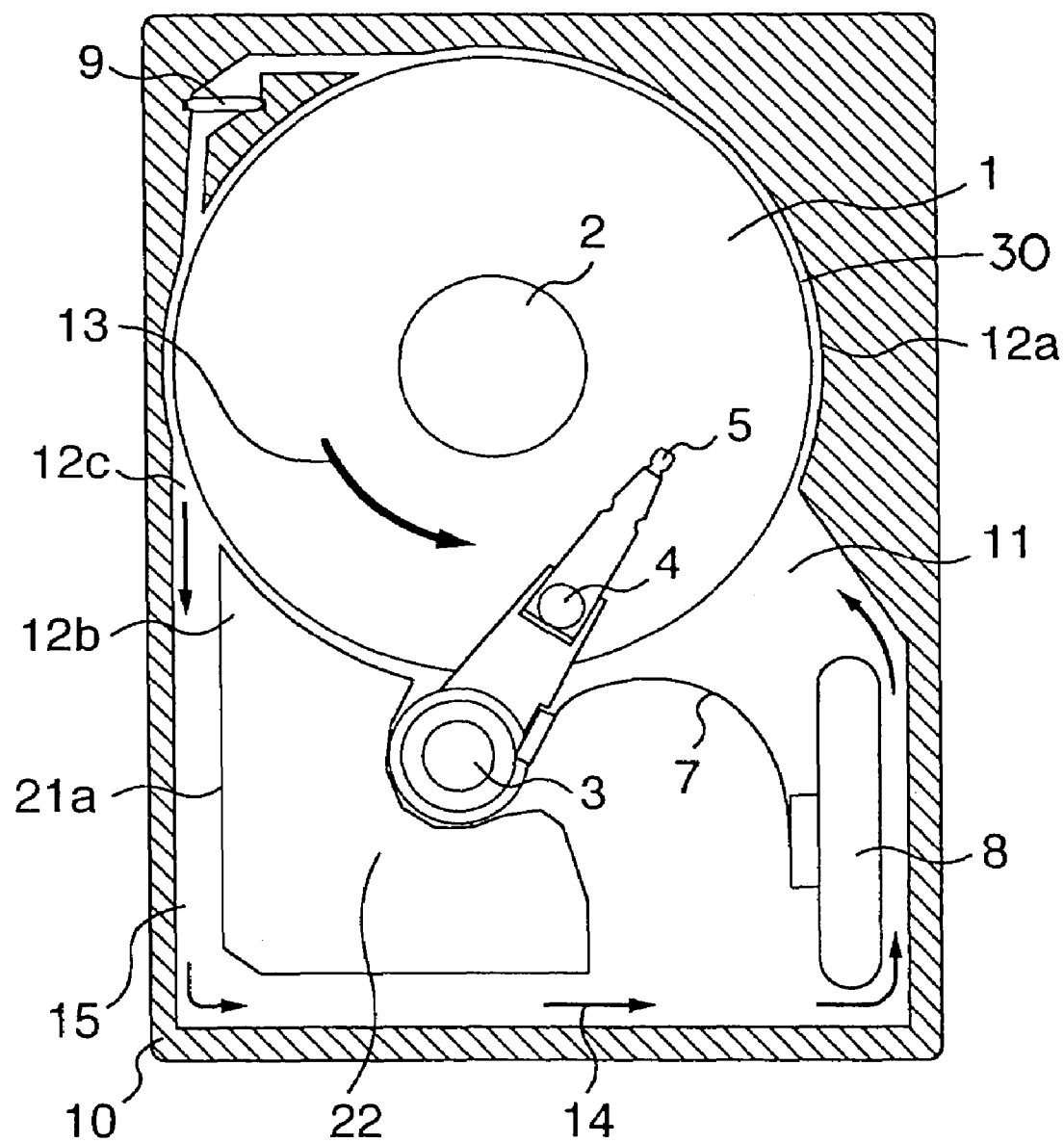
FIG. 5 is a cross-sectional view illustrating a configuration of a magnetic disk apparatus according to a still further embodiment of the invention.

A further embodiment of the invention will be described with reference to FIG. 5. FIG. 5 is a cross-sectional view showing a configuration of a magnetic disk apparatus in the further embodiment, to which the invention is applied.

This embodiment differs from the embodiment shown in FIG. 1 in a manner of forming a bypass channel 15 and a shroud 12b on an upstream side of the arms. In the embodiment, components such as a shroud 12a and a filter 9 are the same as those shown in FIG. 1. An arm downstream space 11 is not provided with any shroud whereby a space sufficient to permit all arms 4 of the rotary actuator to move about a shaft 3 outside a disk stack 1 is ensured. As with the configuration shown in FIG. 1, a signal wire 7 and a signal wire terminal 8 for input/output of a magnetic head 5 are arranged in the space.

Further in this embodiment, a spacing 30 between the outer peripheral end surfaces of the magnetic disks and the shroud 12a is 0.1 to 0.6 mm and generally larger than 0.1 mm and smaller than 0.6 mm. Also, an opening 12c is provided on an upstream side of the arms 4 of the actuator and an open space 11 is provided on a downstream of the arms 4 of the actuator, the opening 12c and the open space 11 being communicated to each other by a bypass channel 15, which is defined by a motor cover 21a and an inner side surface of the housing 10. Also, a shroud 12b is formed between a voice coil motor and the magnetic disks 1. The motor cover 21a is desirably closed so as to prevent an air flow in the bypass channel 15 from entering the voice coil motor. However, only a portion in the vicinity of the opening 12c may be of closed construction so that the construction of the motor cover 21a be fulfilled by the voice coil motor. This becomes less effective in reducing a change in flow velocity in the return channel but is excellent in productivity because of no need of the provision of the motor cover 21a.

In the embodiment, the narrow shroud can reduce flutter of the disks. Also, the provision of the bypass channel communicating between the opening 12c and the open space 11 makes it possible to prevent fluctuation in a difference between high pressure on the upstream side of and the downstream side of the arm. Thereby, flutter can be reduced, and fluctuant forces called wind turbulence and tending to swing the arm can be suppressed. In this manner, narrowing of the shroud and employment of the bypass channel makes it possible to reduce flutter and suppress wind turbulence caused by the arm. Only when these two techniques are used in combination, flutter and vibrations of the arm can be suppressed to realize a magnetic disk apparatus of high speed rotation.

In the embodiments shown in FIGS. 1 and 4, the motor cover 21 is provided to constitute the bypass channel 15 and the shroud 12b on the upstream side of the arms, while in this embodiment any motor cover 21 is not provided and an inner wall of the housing 10 is made a shroud which extends from a shroud 12a to an area, in which an opening 12c is provided, to be concentric with the disk stack 1 except inlet and outlet of air into a filter 9. The remaining inner wall surface of the housing is formed to be flat.

Then, a side surface 12b opposed to the disk stack is formed on a casing 22 of a voice coil motor 6 to be arcuate in concentric manner with the disk stack 1. Further, a side surface 21a of the casing 22 opposed to the housing 10 is formed to be flat in parallel to a planar portion of the inner side surface of the housing 10. Here, the side surface 12b and the side surface 21a are contiguous backward in FIG. 5 to be closed at least for the purpose of blocking air flowing into the voice coil motor from the bypass channel 15.

Without the provision of any motor cover 21, the bypass channel 15 described in the embodiment of FIG. 1 can be constructed by fixing the voice coil motor, which is provided with the casing 22 formed in this manner, to the housing 11 of the magnetic disk apparatus. Thus, according to this embodiment, it is possible to obtain the same effect as that in the embodiment of FIG. 1 simply by changing the voice coil motor and without forming the housing 10 in complicated manner.

The invention can realize a magnetic disk apparatus having a housing structure, which enables suppressing pressure fluctuation, which would occur when arms of a rotary actuator are inserted between the disks, to reduce flutter and wind turbulence and prevent generation of additional pressure fluctuation upstream and downstream of the arms, thus reducing driving power.

What is claimed is:

1. A magnetic disk apparatus comprising:
a plurality of magnetic disks driven to rotate by a spindle motor;
arms supporting magnetic heads on said magnetic disks;
an actuator for moving said arms on said magnetic disks by a voice coil motor; and
a housing surrounding said magnetic disks, said arms and said actuator;
wherein a shroud which arcuately surrounds said magnetic disks along the outer periphery thereof and has an opened portion for inserting said arms is formed in a part of said housing;
wherein said shroud on an upstream side of said arms relative to airflow generated by said magnetic disks when rotating is provided with an opening having a greater width than that of a gap defined between said shroud and said outer periphery of said magnetic disks;
wherein an empty bypass channel is provided and which communicates from said opening through a rear side of said voice coil motor to the downstream side of said arms;
wherein an open space sufficient to permit all of said arms to move from over said magnetic disks beyond said outer periphery of said magnetic disks is provided on the downstream side of said arms, and said empty bypass channel communicates with said open space; and
wherein an air passage is formed, which has an air inlet and an air exhaust port opening on said shroud, said air passage being provided with a filter.

2. A magnetic disk apparatus of claim 1, wherein said open space exposes outer peripheral surfaces of said magnetic disks from said shroud.

3. A magnetic disk apparatus of claim 1, wherein said bypass channel is formed along an inner wall of said housing.

4. A magnetic disk apparatus of claim 1, wherein a side wall of said bypass channel is constituted by a part of an inner wall of said housing.

5. A magnetic disk apparatus of claim 1, wherein a portion of said shroud closer to said arms than said opening of said bypass channel is constituted by a member different from said housing.

6. A magnetic disk apparatus of claim 1, wherein a voice coil motor housing which surrounds a rear portion of said voice coil motor is formed on said shroud portion closer to said arms than said opening of said bypass channel.

7. A magnetic disk apparatus of claim 1, wherein said plurality of magnetic disks are stacked on a rotating shaft driven to rotate by said spindle motor, and said plurality of the arms are arranged to be inserted between said plurality of magnetic disks.

8. A magnetic disk apparatus of claim 1, wherein a shroud portion closer to said arms than said opening of said bypass channel is formed by a component of said voice coil motor.

9. A magnetic disk apparatus of claim 1, wherein said shroud is disposed so that no portion of said shroud is provided between said open space and said magnetic disks.

* * * * *